Patented Dec. 3, 1929

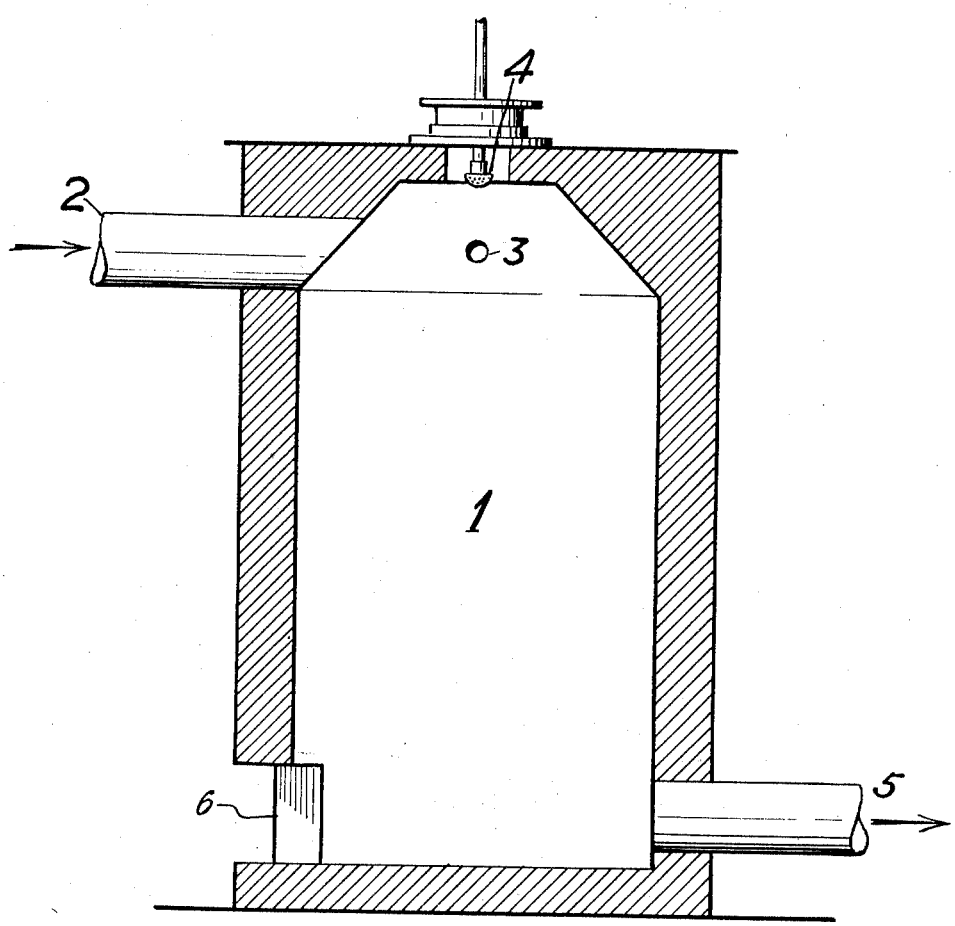

1,738,493

UNITED STATES PATENT OFFICE

PHILIP T. DASHIELL, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE

PROCESS OF MANUFACTURING CARBURETED WATER GAS

Application filed October 28, 1921. Serial No. 511,076.

In the manufacture of oil and water gas, i. e., carbureted water gas, it has been customary to provide a chamber with checkerbrick, to preheat the checkerbrick and to spray oil into the chamber and vaporize it by contact with the checkerbrick, but the checkerbrick required attention and caused expense in removing and cleaning it from time to time because the checkerbrick caught ashes and received a deposit from the oil and the deposit was less objectionable with light oils, such as gasoline, than it was with heavy oils which caused a deposit in coherent masses which adhered to and choked the apparatus. Those skilled in the art know that in the absence of the checkerbrick and with the method of spraying the oil formerly used it would not be possible to operate the carbureted water gas set because the oil would simply collect in a pool at the bottom of the carbureter or superheater.

In one of its aspects my invention comprises the combination of removing the checkerbrick and providing a method of injecting the oil which does not merely shower it down into the bottom of the carbureter, and this invention is valuable not only for heavy Mexican oils that deposit a great deal of coke but also for any kind of high coke-forming oil because it avoids much of the expense of removing the checkerbrick from time to time and of cleaning the carbureter.

The principal object of the present invention is to avoid the deposition of coherent masses of residuum from heavy oils when used for gas making and to deposit the residuum in granular form such that it can be readily removed even by a rake or hoe, thus avoiding stoppage of the apparatus and providing for the satisfactory use of such heavy oils in the manufacture of carbureted water gas.

Generally stated, my improvement in the manufacture of gas from oils consists in avoiding the deposition of coherent masses of residuum, and this I accomplish by subjecting heavy oil in finely divided condition and in a state of suspension to the action of radiant heat which distills off the vapor or distillate from the suspended particles and deposits the residue in granular form.

The apparatus employed in the practice of the invention is subject to wide variation in form but in the drawing I have diagrammatically illustrated one form of apparatus suitable for the purpose of a further description of the invention.

The drawing is a view principally in vertical central section.

Radiant heat is supplied in the enclosed chamber 1 from the walls of the chamber. In the drawing they are internally preheated by the combustion of a mixture of fuel gas and air introduced as at 2 and 3 prior to and in preparation for the vaporization of the oil. The oil is introduced into the preheated chamber so as to be exposed to radiant heat, as shown in the drawings, by means of a spray 4, at which the pressure may be, for example, two hundred pounds per square inch.

The oil is therefore in finely divided condition and in a state of suspension, and out of contact with the walls of the chamber, when the radiant heat causes the vapor or distillate to distill off from the suspended particles so that the residuum falls and is deposited at the bottom of the chamber in granular form and can therefore be readily removed, for example, through the clean-out door 6 shown or indicated at the lower lefthand corner of the figure and heretofore provided and used for the removal of ashes and dust carried over with the air blast. The same kind of a hand tool, as formerly used for removing ashes and dust, can well be employed for removing the residuum by reason of its granular form. The vapor or distillate is carried forward in the manufacture of carbureted water gas by water gas entering at 2 and leaving at 5 for subsequent and appropriate treatment.

It will be obvious to those skilled in the art to which the invention relates that modifications may be made in details of procedure without departing from the spirit of the invention which is not limited as to those matters or otherwise than as the prior art and the appended claims may require.

I claim:

1. In the manufacture of carbureted water gas; the improvement which consists in providing an upright carbureter devoid of checkerbrick and having a gas intake at its top and a gas side outlet at its bottom, intermittently preheating said carbureter by internal combustion, alternately providing a downwardly directed fog of heavy oil at the top of the carbureter and flowing water gas from an outside source downwardly through and laterally out at the bottom of said carbureter, and depositing the residual carbon in granular form at the bottom of the chamber by gravity and by the downward flow and change in direction of flow of the water gas.

2. In the manufacture of carbureted water gas; the improvement which consists in intermittently establishing an unobstructed vertical path of radiant heat extending downwardly from the gas inlet to the gas outlet of a closed chamber by internal combustion, alternately introducing from an outside source and conducting a stream of water gas downwardly and along said preheated unobstructed path from the inlet to the outlet, feeding heavy oil in finely divided condition at the inlet portion of said path to and in the same direction as said stream of gas, distilling off the vapor or distillate from the particles of oil while suspended in the stream of water gas and while traversing said path by the action of the prestored radiant heat, and freely depositing the residuum in granular form from the unobstructed downward path to the bottom of the chamber.

PHILIP T. DASHIELL.